Patented Oct. 9, 1923.

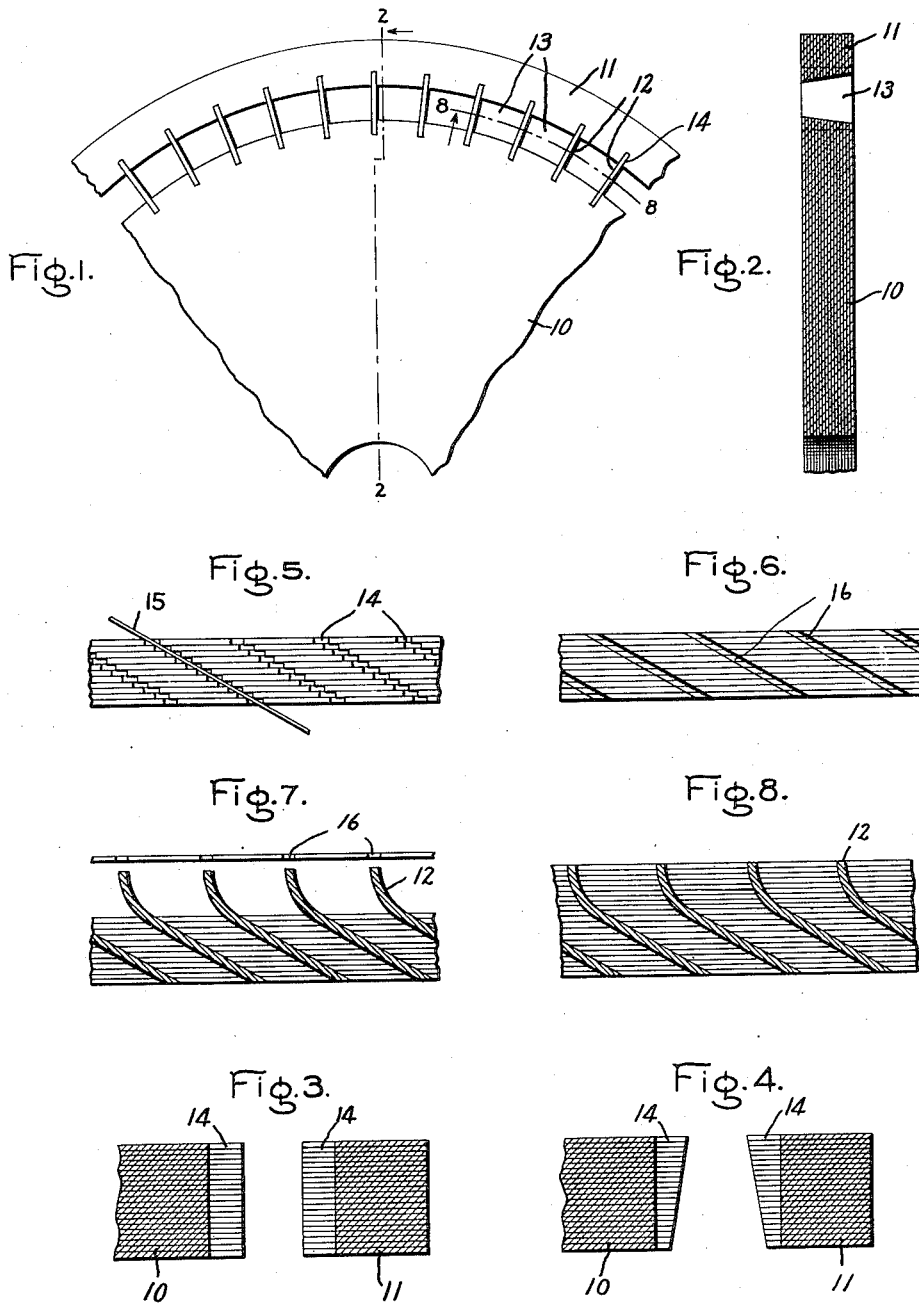

1,470,497

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

DIAPHRAGM FOR ELASTIC-FLUID TURBINES AND METHOD OF MAKING SAME.

Application filed September 30, 1918, Serial No. 256,363. Renewed July 20, 1923.

*To all whom it may concern:*

Be it known that I, CHRISTIAN STEENSTRUP, a citizen of the United States, residing at Schenectady, in the county of Schenectady, State of New York, have invented certain new and useful Improvements in Diaphragms for Elastic-Fluid Turbines and Methods of Making Same, of which the following is a specification.

The present invention relates generally to elastic fluid turbines and has for its object to provide an improved diaphragm structure and method of making the same.

For a consideration of what I believe to be novel and my invention, attention is directed to the accompanying description and the claims appended thereto.

In the drawing, Fig. 1 is a side elevation of a portion of a diaphragm embodying my invention; Fig. 2 is a sectional view taken on line 2—2, Fig. 1; and Figs. 3, 4, 5, 6, 7 and 8 illustrate successive steps which are followed in constructing a diaphragm according to my method, Fig. 8 being a section taken on line 8—8, Fig. 1.

As is well understood, a diaphragm for an elastic fluid turbine comprises a central or web member as indicated at 10 in Figs. 1 and 2 and an outer or ring member 11 concentric therewith, the two members, 10 and 11 being spaced apart to leave an annular passage between them in which are arranged suitable plates 12 which divide the annular passage into passages or nozzles 13 for directing the flow of elastic fluid. The passages or nozzles 13 must have a correct shape to effect the desired expansion of the elastic fluid therein and properly direct the flow of the elastic fluid to the turbine wheel and to this end plates 12 may have a curved admission end and a straight discharge end and they may be placed at an angle as shown in Fig. 8. Also, the annular passage between the two members 10 and 11 is usually made diverging from the entrance edge to the exit edge as shown in Fig. 2, so as to give diverging nozzles, although this may or may not be done, depending on the particular case.

According to my invention I construct a diaphragm of sheets or laminations rigidly fixed together preferably by fusion of metal as by soldering, welding or brazing and with the nozzle partition plates similarly fixed into place. Such a nozzle diaphragm offers the advantage of being comparatively cheap to build, very strong, not likely to buckle or bend, and very unlikely to have or develop any defects.

The exact details of my method will vary somewhat depending on the specific contour which a particular diaphragm may have, but for purposes of illustration I have chosen a representative case wherein the annular space between the web member and the ring member is diverging in radial section and the partition plates are set at an angle to the axis of the shaft and have curved admission ends and straight discharge ends.

In carrying out my invention in connection with the representative case just referred to, I construct the web member 10 and ring member 11 of a number of flat sheets, disks or laminations laid one on top of another. These sheets, disks or laminations are stamped from suitable sheet material and during the stamping operation are provided with spaced slots 14 in which the edges of the plates 12 are to be located. After being stamped out, the sheets for a web member and a ring member are stacked one on another to form a built-up structure of the desired thickness and the two members are clamped in correct relation to each other as indicated in Fig. 3 after which the annular space between them is machined to the correct or desired shape which may be that in Fig. 4, for example. The sheets are then unclamped and the portions of them which are to receive straight parts of partition plates 12 are assembled with the slots 14 in each sheet slid slightly beyond the slots 14 in the next adjacent sheet as shown in Fig. 5. The sheets may be assembled on a rod as shown at 15 which will serve to position the sheets so that the slots 14 therein will form a continuous groove having the desired angle to the axis of the diaphragm. Preferably, a suitable tool is then run through the slots 14 to cut off the corners of the material at the edges of slots 14 to form smooth continuous grooves as indicated at 16 in Fig. 6. After the web member 10 and ring member 11 have been formed to the extent shown in Fig. 6 they are then placed in correct relation to each other and the straight portions of the partition plates 12 are inserted into position in grooves 16 as shown in Fig.

7, leaving the curved portions thereof projecting. The remaining sheets necessary to form the web member and ring member are then placed one at a time in position over the curved portions of plates 12 after the manner suggested by Fig. 7. This results in building up the structure to the extent shown in Fig. 8. The sheets and partition plates are then all fastened together preferably by fusion of metal as by welding, brazing or soldering to form a finished diaphragm.

It will be understood that in case the annular groove between the two members 10 and 11 is not to be diverging in cross-section as shown, the two steps illustrated in Figs. 3 and 4 will be omitted. It will furthermore be understood that the steps of the method disclosed will be varied to suit any particular design of diaphragm, the general principle employed remaining the same.

It will also be understood that while I have particularly illustrated and described my invention in connection with diaphragms, this being a primary application of it, the invention, as to some of its aspects, is not necessarily limited thereto but may be carried out in connection with other turbine elements or parts.

The method described has the advantage that it is comparatively cheap to follow out and requires little machine work. The most of the work is done by stamping and the assembling is simple and does not require highly skilled workmen.

The resulting structure is a strong one and one not likely to buckle or prove defective. Should there be a defective place in one of the sheets of a diaphragm there will be other sheets directly adjacent it not defective so that the result of such a defect is not fatal.

In accordance with the provisions of the patent statutes I have described the principle of operation of my invention, together with a particular method and apparatus which I now consider to represent the best embodiment thereof, but I desire to have it understood that the particular method and apparatus disclosed are only illustrative, and that the invention can be carried out with such modifications as come within the scope of the appended claims.

What I claim as new and desire to secure by Letters Patent of the United States, is,—

1. The method of manufacturing a diaphragm comprising a web member and a ring member with partition plates between them, which comprises building up the two members from sheets, assembling the plates between them and fastening the sheets and plates together by fusion of metal.

2. The method of manufacturing a diaphragm comprising a web member and a ring member with partition plates between them, which comprises building up the two members from sheets having spaced slots therein, assembling the plates with their edges in said slots, and fastening the sheets and plates together by fusion of metal.

3. The method of manufacturing a diaphragm comprising a web member and a ring member with partition plates between them, which comprises building up the two members from sheets having spaced slots therein, the sheets in each member being arranged relatively to each other so that the slots form a continuous groove, and assembling the plates with their edges in said grooves.

4. The method of manufacturing a diaphragm comprising a web member and a ring member with partition plates between them, which comprises building up the two members from sheets having spaced slots therein, the sheets in each member being arranged relatively to each other so that the slots form a continuous groove, assembling the plates with their edges in said grooves, and rigidly fastening the sheets and plates together.

5. The method of manufacturing a diaphragm comprising a web member and a ring member with partition plates between them, which comprises building up the two members from sheets having spaced slots therein, the sheets in each member being arranged relatively to each other so that the slots form a continuous groove, assembling the plates with their edges in said grooves, and fastening the sheets and plates together by fusion of metal.

6. The method of making a diaphragm comprising spaced concentric inner and outer members with partition plates between them, which comprises building up said two members from thin sheets, supporting them in spaced relation to each other, assembling the partition plates between them, and rigidly fastening the members and plates together.

7. The method of making a diaphragm comprising spaced concentric inner and outer members with partition plates between them, which comprises building up said two members from thin sheets having spaced slots therein, the sheets in each member being arranged relatively to each other so that the slots form continuous grooves which extend at an angle to the axis of the diaphragm, mounting said members in concentric relation to each other, assembling the partition plates in said grooves, and fastening the members and plates together by fusion of metal.

8. The method of making a diaphragm comprising spaced concentric inner and outer members with partition plates between them, which comprises building up said two members from thin sheets having spaced slots therein, the sheets in each member being arranged so that the edges of the slots overlap each other, forcing a tool through said slots to form a groove having smooth sides, and assembling the partition plates in said grooves.

9. The method of making a diaphragm comprising spaced concentric inner and outer members with partition plates between them, which comprises building up said two members from thin sheets having spaced slots therein, clamping said members in spaced relation to each other, cutting the adjacent surfaces of said two members to form between them an annular passage having the desired contour, mounting the partition plates in said slots, and rigidly fastening the members and plates together.

10. The method of making a diaphragm comprising spaced concentric inner and outer members with partition plates between them, which comprises building up said two members from thin sheets having spaced slots therein, clamping said members in spaced relation to each other, cutting the adjacent surfaces of said two members to form between them an annular passage having the desired contour, reassembling the sheets of each member so the slots form grooves which extend at an angle to the axis of the diaphragm, mounting the partition plates in said grooves, and fastening the plates and members together by fusion of metal.

11. The method of manufacturing a diaphragm comprising spaced concentric inner and outer members with partition plates between them, such plates having a straight portion and a curved portion, which comprises building up the two members from thin sheets having spaced slots therein to a thickness equal to the straight portions of the plates, mounting the straight portions of the plates in said slots, and then adding additional sheets with their slots in engagement with the curved portions of said partition plates.

12. The method of manufacturing a diaphragm comprising spaced concentric inner and outer members with partition plates between them, such plates having a straight portion and a curved portion, which comprises building up the two members from thin sheets having spaced slots therein to a thickness equal to the straight portions of the plates, mounting the straight portions of the plates in said slots, adding additional sheets with their slots in engagement with the curved portions of said partition plates until the desired thickness of diaphragm is obtained, and fastening said plates and members together by fusion of metal.

13. The method of manufacturing a diaphragm comprising spaced concentric inner and outer members with partition plates between them, such plates having a straight portion and a curved portion, which comprises building up the two members from thin sheets having spaced slots therein to a thickness equal to the straight portions of the plates, the slots in successive sheets of each member overlapping to form a continuous groove which extends at an angle to the axis of the diaphragm, assembling the straight portions of the partition plates in said grooves, adding additional sheets with their slots in engagement with the curved portions of said partition plates, and fastening said plates and members together by fusion of metal.

14. The method of manufacturing a diaphragm comprising spaced concentric inner and outer members with partition plates between them, such plates having a straight portion and a curved portion, which comprises building up the two members from thin sheets having spaced slots therein to a thickness equal to the straight portions of the plates, the slots in successive sheets of each member overlapping, forcing a tool through said slots to form a groove having smooth sides, assembling the straight portions of said partition plates in said grooves, adding additional sheets with their slots in engagement with the curved portions of said partition plates, and fastening said plates and members together by fusion of metal.

15. The method of manufacturing a diaphragm comprising spaced concentric inner and outer members with partition plates between them, such plates having a straight portion and a curved portion, which comprises building up the two members from thin sheets having spaced slots therein to a thickness equal to the desired diaphragm thickness, clamping said members in spaced relation to each other, cutting the adjacent surfaces of said two members to form between them an annular passage having the desired contour, unclamping said members and removing therefrom sheets equal to the curved portion of said partition plates, assembling the straight portions of said plates in the slots of the remaining sheets, replacing along the edges of the curved portions of said plates the sheets which were removed, and fastening said plates and members together by fusion of metal.

16. The method of manufacturing a diaphragm member which comprises taking a plurality of sheets having spaced slots therein, and stacking the sheets one on another with some of said slots engaging a guide means so as to cause the slots to form continuous grooves having a desired slope.

17. The method of manufacturing a diaphragm member which comprises taking a plurality of sheets having spaced slots therein, stacking the sheets one on another with some of said slots engaging a guide means so as to cause the slots to form continuous grooves having a desired slope, and running a tool through such grooves to smooth the surfaces of them.

18. A diaphragm formed of a plurality of sheets stacked on one another and fastened together by fusion of metal.

19. A diaphragm comprising spaced concentric members with partition plates between them, said members being formed from sheets stacked one on another and fastened together and to said plates by fusion of metal.

20. A web member for a turbine diaphragm comprising a stack of thin sheets fastened together by fusion of metal.

21. A self-contained element for a turbine structure comprising a stack of thin sheets fastened together by fusion of metal to form a rigid, unitary structure.

22. An element for a turbine comprising separate spaced concentric members with separately formed means between them which define fluid passages, at least one of said members being formed from sheets stacked one on another and fastened together by fusion of metal.

23. An element for a turbine comprising separate spaced concentric members with separately formed means between them which define fluid passages, said members being formed from sheets stacked one on another and fastened together by fusion of metal.

24. An element for a turbine comprising spaced concentric members with means between them which define fluid passages, said members being formed from sheets stacked one on another and fastened together by fusion of metal, and said members and means being fastened together by fusion of metal.

25. The method of manufacturing an element for a turbine comprising two concentric members with means between them which define fluid passages, which comprises building up the two members from sheets and assembling the means between them, said sheets being fastened together by fusion of metal.

26. The method of manufacturing an element for a turbine comprising two concentric members with means between them which define fluid passages, which comprises building up the two members from sheets and assembling the means between them, said sheets being fastened together by fusion of metal, and said means being fastened to the members by fusion of metal.

In witness whereof, I have hereunto set my hand this 27th day of September, 1918.

CHRISTIAN STEENSTRUP.